Dec. 21, 1926.
O. T. MEEKS
AUTOMATIC OIL FILTER
1,611,314
Filed Oct. 15, 1925　　2 Sheets-Sheet 1
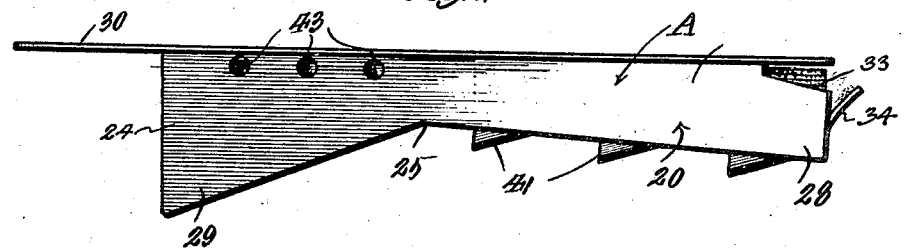
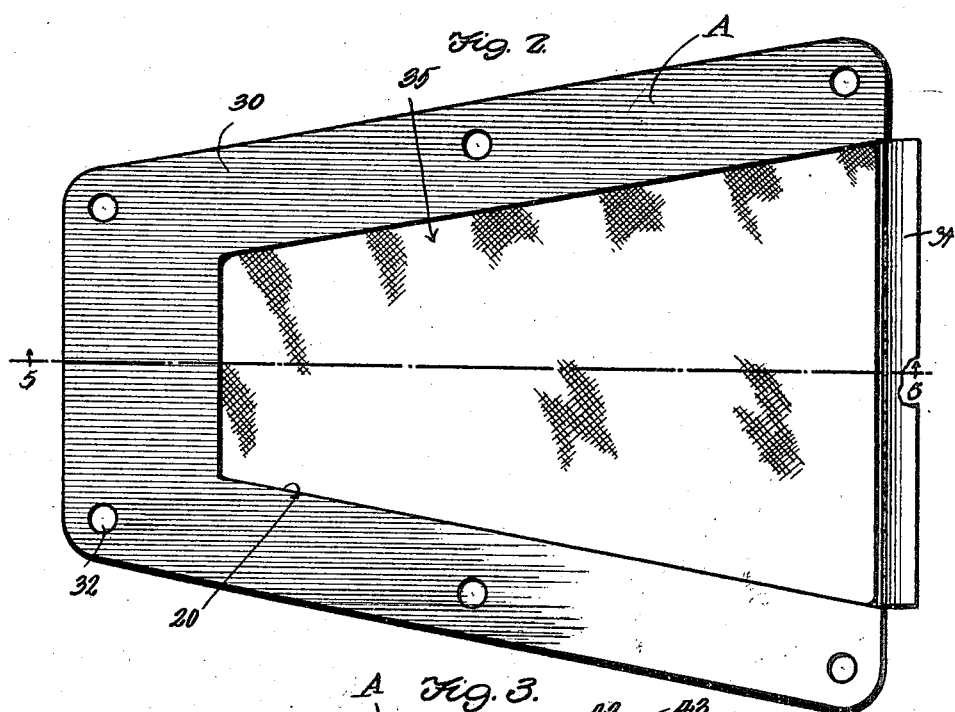
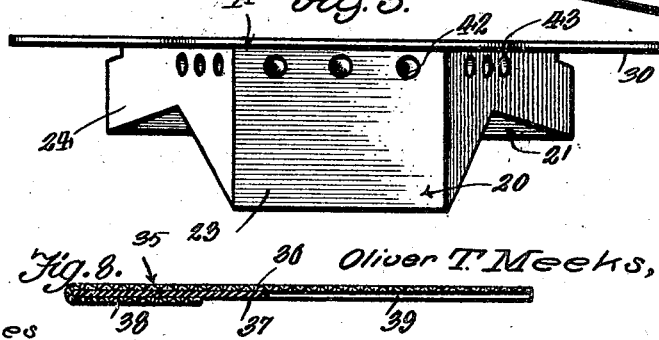
Oliver T. Meeks, Inventor
By Richard B. Owen, Attorney
Witnesses Dec. 21, 1926.　　　　　　　　　　　　　　　　1,611,314
O. T. MEEKS
AUTOMATIC OIL FILTER
Filed Oct. 15, 1925　　　2 Sheets-Sheet 2
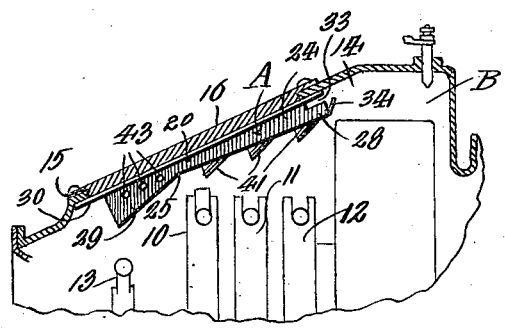
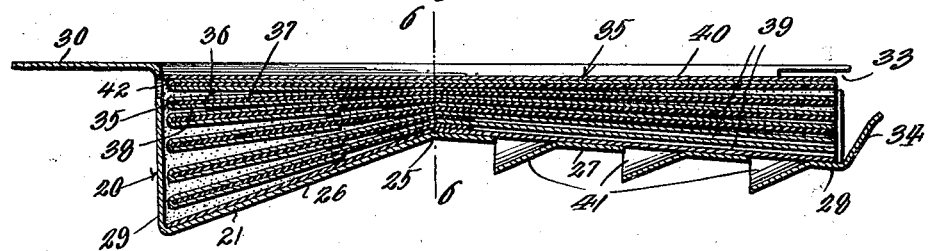
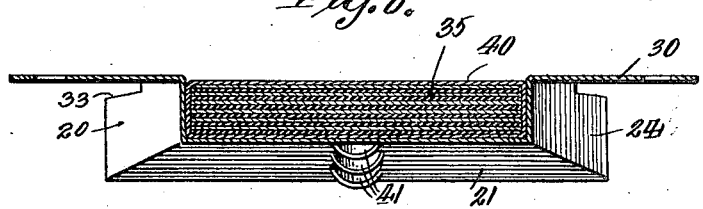
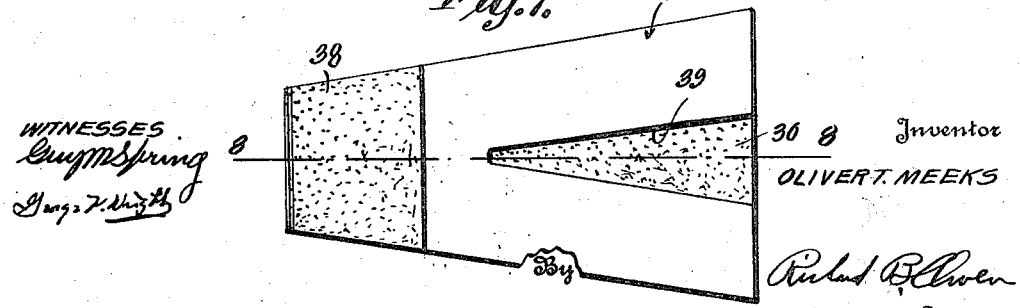
Inventor
OLIVER T. MEEKS Patented Dec. 21, 1926.

1,611,314

UNITED STATES PATENT OFFICE.

OLIVER T. MEEKS, OF TAMPA, FLORIDA.

AUTOMATIC OIL FILTER.

Application filed October 15, 1925. Serial No. 62,683.

This invention appertains to a novel filtering device and more particularly to an attachment for the transmission of an automobile for automatically filtering the oil supplied to the transmission bands, clutch collar and the engine.

The primary object of the present invention is to provide an attachment for the transmission of automobiles of the type utilizing grip bands, so positioned as to receive the lubricating oil from the transmission case and filter the same prior to delivery thereof to the transmission bands and clutch collar, the filter effectively removing all foreign elements from the oil such as carbon, particles of metal and the like, the filter also effectively eliminating the short circuiting of the magneto, by the removal of foreign elements from the lubricating oil.

A further object of the invention is to provide a novel automatic oil filter of a transmission case of an automobile embodying means for collecting the oil at the front of the filter and novel means for delivering the filtered oil directly above the transmission bands and the clutch collar.

A further object of the invention is to provide a novel automatic oil filter for transmission cases embodying a novel casing, novel means for associating the casing with the transmission, and novel means for mounting removable filter pads within the casing.

A still further object of the invention is to provide an automatic oil filter of the above character, which will be durable and efficient in use, one that will be simple and easy to manufacture and one which can be placed upon the market and incorporated with a conventional transmission case without change thereto at a small cost.

With these and other objects in view, the invention consists in the novel construction, arrangement and formation of parts, as will be hereinafter more specifically described, claimed, and illustrated in the accompanying drawings, in which drawings:

Figure 1 is a side elevation of the improved automatic oil filter,

Figure 2 is a top plan view of the same,

Figure 3 is a rear elevation of the filter,

Figure 4 is a longitudinal section through a transmission showing the filter in use, Figure 5 is a longitudinal section through the filter taken on the line 5—5 of Figure 2, Figure 6 is a transverse section through the filter taken on the line 6—6 of Figure 5, Figure 7 is a bottom plan view of one of the filter pads, and Figure 8 is a longitudinal section through the same taken on the line 8—8 of Figure 7.

Referring to the drawings in detail, wherein similar reference characters designate corresponding parts throughout the several views, the letter A generally indicates the improved automatic oil filter and B a transmission, with which the same can be associated. The transmission B has been shown to illustrate more particularly, the use of the invention and is of the conventional planetary gear type embodying spaced transmission bands 10, 11 and 12, and the clutch collar 13. These parts are arranged in the ordinary manner within the casing 14, which is provided with the opening 15 normally closed by the removable cover plate 16 which allows access to be had to said bands 10, 11 and 12.

The improved automatic oil filter is adapted to be associated with the transmission directly above the bands 10, 11 and 12 and the clutch collar 13 and embodies a pan 20, preferably formed of sheet metal. This pan 20 includes the bottom wall 21, the front wall 22, the rear wall 23 and the diverging side walls 24. As clearly shown in Figures 1 and 5 of the drawings, the bottom wall 21 is bent transversely as at 25 to define the oppositely inclined portions 26 and 27 on the bottom wall. This forms substantially front and rear oil collecting wells 28 and 29. The marginal edges of the rear wall 23 and the side walls 24 are provided with right angularly extending attaching flanges 30 which are adapted to engage the transmission casing around the opening 15. The cover plate 16 for the transmission casing is adapted to close the upper end of the pan and when the retaining bolts of the cover is placed in position, the pan will be held against displacement, the flanges 30 being provided with openings 32 for receiving the said fastening bolts or screws for the cover plate. The forward portions of the side walls 24 are notched as at 33 and the extreme upper edge of the front wall 22 is provided with a forwardly inclined arcuate oil collecting lip 34. This lip is adapted to collect the oil from the transmission and convey the same to the filtering pads 35 which are arranged in the pan. The filtering pads 35 are arranged in superimposed relation and each includes a fabric 36 and a plate of absorbent material 37, such as blotting paper. The rear end of the fabric 36 is folded about the rear edge of the absorbent plate 37, as at 38. These filtering pads 35 are of a substantial frusto-triangular shape when viewed in plan, so as to conform to the configuration of the pan. The lowermost pads 35 have inwardly directed triangular notches 39 cut theren, in order to permit the free flow of oil therethrough at the forward end of the pan.

In accordance with this invention, the forwardly and downwardly inclined filtering portion 27 of the wall 21 is provided at its longitudinal center with rearwardly directed outlet nipples 41 which are arranged directly below the notched portions 39 of the two lowermost filtering pads 35. These outlet nipples 41 are arranged respectively directly above the transmission bands 10, 11 and 12. The upper end of the rear wall 23 is provided with outlet openings 42 and the overflow of oil from the well 29 will drip out of the openings and effectively lubricate the clutch collar 13 which is positioned directly below the same. If preferred the side walls 24 adjacent to the rear ends thereof can be provided with suitable outlet openings 43.

In use of the improved automatic filter, the same is applied to the transmission casing as described, and the oil collected by the pan will filter through the pads 35 one after the other and the clean oil will be delivered to the bands 10, 11 and 12 through the outlet nipples 41. The excess oil collecting in the well 29 will drip through the openings 42 and 43 on the clutch collar as heretofore described.

The filter will effectively remove all foreign particles from the oil and thus keep the same in a clean condition and effectively prevent short circuiting of the magneto by removing the metal particles from the oil.

From the foregoing description, it can be seen that I have provided novel means for filtering lubricating oil for the transmissions of automobiles, which can be readily applied to the transmission case without any change thereto.

Changes in details may be made without departing from the spirit or scope of this invention, but

What I claim as new is:

1. The combination with a transmission including a casing, spaced transmission bands arranged in the casing and a clutch collar, the transmission casing being provided with an opening directly above the bands, a removable cover for the opening, of an automatic oil filter for the transmission embodying a pan, means carried by the forward end of the pan for collecting oil, removable filtering pads arranged in the pan, each including a filtering fabric and an absorbent plate, a plurality of spaced oil outlets formed on the lower wall of the pan at the longitudinal center thereof directly below the pads for permitting the escape of filtered oil to said band, one of said oil outlets being arranged directly above the band.

2. An oil filter for the transmission of automobiles embodying a pan, attaching flanges formed on the upper marginal edges of the pan, an oil collecting device carried by the forward end of the pan, a filtering medium arranged in the pan including a plurality of superimposed pads, each embodying a fabric sheet and an absorbent plate, the lower wall of the pan being provided with spaced oil outlets at the longitudinal center thereof and adjacent to the forward end thereof, the rear end of the pan being provided with oil escape openings.

3. An oil filtering device for the transmission of automobiles embodying a pan including diverging side walls, a bottom wall, a front and a rear wall, attaching flanges formed on the sides and rear walls, an oil collecting lip carried by the upper edge of the front wall extending forwardly thereof, the bottom wall including oppositely inclined portions defining oil collecting wells, and a removable oil filtering medium arranged in the pan including a plurality of superimposed pads each including a fabric filtering sheet and an absorbent filtering plate, the forwardly inclined portion of the bottom wall being provided with spaced rearwardly directed longitudinally alined oil outlets, the portions of the casing above the rear well being provided with oil outlet openings.

4. An oil filtering device for the transmission of automobiles comprising a pan, oil collecting means carried by the forward end of the pan, attaching means for the pan, a removable filtering device disposed in the pan including a plurality of superimposed pads, each pad including a filtering fabric and an absorbent filtering plate, the two lowermost plates at the forward ends thereof being provided with V-shaped notches, and spaced outlet openings carried by the bottom wall of the filtering pan arranged directly below the V-shaped notches in the filtering plates of the lowermost pads.

In testimony whereof I affix my signature.

OLIVER T. MEEKS.